(12) United States Patent
Maeda et al.

(10) Patent No.: US 7,462,226 B2
(45) Date of Patent: *Dec. 9, 2008

(54) RUSTPROOFING COMPOSITION

(75) Inventors: Takahide Maeda, Wako (JP); Toshiya Nishino, Wako (JP); Noriharu Tanaka, Tokyo (JP); Kazuhiko Maesori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 505 days.

This patent is subject to a terminal disclaimer.

(21) Appl. No.: 11/167,118

(22) Filed: Jun. 28, 2005

(65) Prior Publication Data

US 2006/0003904 A1    Jan. 5, 2006

(30) Foreign Application Priority Data

Jun. 30, 2004    (JP)    ............................. 2004-192873

(51) Int. Cl.
  *C23F 11/00*    (2006.01)
(52) U.S. Cl. .............. 106/14.22; 106/14.23; 106/14.24; 106/14.26; 106/14.27; 106/14.28; 106/14.29; 106/14.34; 106/14.35; 106/14.36; 106/14.41
(58) Field of Classification Search .............. 106/14.22, 106/14.23, 14.24, 14.26, 14.27, 14.28, 14.29, 106/14.34, 14.35, 14.36, 14.41
See application file for complete search history.

(56) References Cited

U.S. PATENT DOCUMENTS 6,103,306 A    8/2000    Miyahara et al.
6,312,509 B1    11/2001    Moradian
2002/0098989 A1    7/2002    Heimann et al.
2006/0047026 A1 *   3/2006    Yamada et al. ................. 524/9

FOREIGN PATENT DOCUMENTS

| EP | 1 344 801 A1 | | 9/2003 |
|---|---|---|---|
| JP | 55118972 A | * | 9/1980 |
| JP | 60-40159 A | | 3/1985 |
| JP | 61-55198 A | | 3/1986 |
| JP | 1-92267 A | | 4/1989 |
| JP | 1-250476 A | * | 10/1989 |
| RO | 107671 B1 | * | 12/1993 |

* cited by examiner

*Primary Examiner*—Anthony J Green
(74) *Attorney, Agent, or Firm*—Arent Fox LLP.

(57)    ABSTRACT

A rustproofing composition has superior properties satisfying rustproofing quality requirements and work quality requirements for parts around tires, parts with pockets, and plate-bonded parts, and having volatile organic solvent of not more than 10 mass %. A rustproofing composition has 5 to 60 mass % of the overall composition of at least one kind of heat-polymerized drying oil in which oil having an iodine value of not less than 130 is heat-polymerized, and 1 to 50 mass % of the overall composition of at least one kind of wax selected from natural waxes and synthetic waxes, and/or at least one kind of rustproofing additive dissolved or dispersed in mineral oil type lubricant based oils, synthetic lubricant based materials or liquid saturated-hydrocarbon mixtures vegetable oil based semidrying oils, and vegetable oil based nondrying oils. In the rustproofing composition, nonvolatile content at 105° C. for 3 hours is not less than 90 mass %.

8 Claims, No Drawings

RUSTPROOFING COMPOSITION

BACKGROUND OF THE INVENTION

1. Technical Field

The present invention relates to rustproofing compositions which are applied to parts for car bodies, parts with pockets or the like in vehicles, in particular in automobiles, and relates to rustproofing compositions which can be used for long-term rustproofing for common metallic materials.

2. Background Art

As a rustproofing agent for parts around tires, parts with pockets, and plate-bonded parts, a rustproofing agent in which wax and several kinds of additives are dissolved or dispersed in organic solvents such as mineral spirits, that is, wax-type rustproofing agents, have been used. Because these compositions exhibit high rustproofing ability, these compositions are also used as long-term rustproofing agents for metallic materials outdoors.

As a conventional wax-type rustproofing agent, for example, compositions with improved coating ability are disclosed in Japanese Unexamined Patent Application Publication No. 40159/85 or No. 92267/89, and a composition which improves production technology is disclosed in Japanese Unexamined Patent Application Publication No. 55198/86. However, in these compositions, organic solvents such as mineral spirits are used as solvents for dilution and dispersion. There are cases in which more than 70 mass % of such solvents is contained. Therefore, the organic solvent in the compositions evaporate into the air to form the wax coating which is a half-hard coating after the compositions are applied. Because such evaporated organic solvents are recently considered to be one of the causes of global warming, research to reduce organic solvents which are used in coatings is often performed and movements to regulate the amount of volatile organic solvent by law are increasing.

However, in the case in which organic solvents evaporated from the wax-type rustproofing agents are simply reduced, the viscosity of the agent is increased and sufficient permeation into gaps cannot be obtained. Therefore, 80 mass % of non-volatile content was a limit to maintain sufficient permeation in conventional technology. Furthermore, as a method to reduce organic solvents evaporated from the wax-type rustproofing agent, a method in which the organic solvent used in the compositions is substituted by high-viscosity oil having low volatility was examined. However, in this method, the coated film did not dry, the coated film flowed off under high temperatures or vibrations, the coated film was easily removed by a physical force such as contact with water or the like, and sufficient rustproofing ability could not be obtained.

In addition, as a method to reduce organic solvent, a method in which water-based rustproofing component is used was suggested. However, when the water-based rustproofing agents were applied to pockets in parts of car bodies or plate-bonded parts, water which was contained in the permeated compositions could not be evaporated and rust was generated. Furthermore, a rust preventing method in which a wax composition in a solid state at normal temperatures is heated to melt and is coated by dipping these parts into the melted wax, or a rust preventing method in which melted wax is used, was developed. However, such methods require large-scale equipment, and large amounts of heat are required to melt the solid wax, and these methods therefore have problems in cost efficiency.

SUMMARY OF THE INVENTION

Therefore, an object of the present invention is to provide a rustproofing composition which can provide required rustproofing quality and workability for parts around tires, parts with pockets, plate-bonded parts or the like of car bodies, and which is environmentally friendly, containing volatile organic solvent of not more than 10 mass %. Specifically, an object is to provide a rustproofing composition which has low viscosity, sufficient permeability, superior rustproofing ability, and which can form a dry flexible coating after a coating treatment.

The inventors noted that despite the fact that drying oils, among oils and fats, is liquid at normal temperatures, a dry coating can be formed by oxidation polymerization if the drying oil is brought into contact with air. They succeeded in development of a wax-type rustproofing composition in which a desired flexible coating can be formed without using volatile organic solvents by mixing the drying oil with coating agents or solvents having low volatility.

Therefore, the rustproofing composition of the present invention includes: at least one kind of heat-polymerized drying oil selected from polymerized oils in which oils having an iodine value of not less than 130 are heat-polymerized for 5 to 60 mass % of the overall composition; and at least one of a wax selected from natural waxes and synthetic waxes and a rustproofing additive selected from sulfonates, carboxylic acid salts, fatty acid esters, amine salts, oxide paraffin salts, and oxide wax salts for 1 to 50 mass % of the entirety of the composition; the heat-polymerized drying oil, the wax, and the rustproofing additive are dissolved or dispersed in at least one kind of solvent selected from mineral oil type lubricant based oils, synthetic lubricant oil based materials, liquid saturated hydrocarbon mixtures, vegetable oil based semidrying oils and vegetable oil based non-drying oils. Furthermore, in the rustproofing composition, nonvolatile content at 105° C. for 3 hours is not less than 90 mass %.

In addition, in the rustproofing composition of the present invention, it is desirable that the solvent be one kind selected from mineral oil type lubricant based oils, synthetic lubricant oil based materials, and liquid saturated hydrocarbon mixtures. Furthermore, it is desirable that the non-volatile content at 105° C. for 3 hours be not less than 90 mass %. Furthermore, in the rustproofing composition of the present invention, in addition to the above mentioned components, at least one kind of drying oil selected from oils having an iodine value of not less than 130, can be added for not more than 60 mass % of the overall composition.

In the present invention, long-term rustproofing effects can be obtained which are similar to those of rustproofing wax which contains conventional organic solvents. Furthermore, not only can the same method be used as for the conventional wax, but also it is effective for reducing global warming because the volatile organic solvent content is lower. In addition, since hardening reaction by oxidation polymerization is applied to the rustproofing composition of the present invention, in the case in which the rustproofing composition is coated on plate-bonded parts of parts with pockets or the like, for example, it remains undried because contact with air is insufficient inside. Therefore, it efficiently conforms to the deformations of car bodies during running. As a result, long-term rustproofing effects can be anticipated. Furthermore, because wax which adheres to painted surfaces may stain the paint in the case in which wax which contains conventional solvent is used, the wax which adhered during transport or manufacturing must be removed immediately. However, the rustproofing composition of the present invention does not stain paint because no solvent is contained. Therefore, no removing process is required.

EMBODIMENTS OF THE INVENTION

Next, the rustproofing composition of the present invention is further explained in detail.

Heat-polymerized drying oils used in the present invention are heat-polymerized oils of oils having an iodine value not less than 130. Specifically, heat polymerized oils of linseed oil, perilla oil, tung oil, hempseed oil, safflower oil, oiticica oil, sardine oil, herring oil, dehydrated castor oil in which castor oil is dehydrated to produce conjugated acid, synthetic drying oil, or the like can be used. It is desirable that in particular among these oils, heat polymerized oils of linseed oil, tung oil and dehydrated castor oil which can be obtained easily be used singly or in mixtures. It is more desirable that the contained amount of heat-polymerized oils of dehydrated castor oil be greater. In the present invention, the contained amount of heat-polymerized drying oils is in a range of 5 to 60 mass % of the entirety of the composition, and desirably in a range of 10 to 20 mass %. In the case in which the contained amount is less than 5 mass %, sufficient drying property of the rustproofing composition coating cannot be obtained, and as a result, forms undesirable insufficiently dried coatings. On the other hand, in the case in which the contained amount is more than 60 mass %, viscosity of the rustproofing composition is too high to deteriorate workability, and it becomes difficult to perform coating uniformly.

As waxes of the present invention, vegetable oil based waxes such as candelilla wax, carnauba wax, rice wax, haze wax, jojoba wax or the like, animal oil based waxes such as beeswax, lanolin wax, spermaceti wax(Spermaceti wax is a wax obtained from head cavity of sperm whale. After death of the sperm whale, part of oil in the cavity is solidified, the oil is filtered to obtain crude wax. This crude wax is purified by treating with sodium hydroxide and potassium carbonate.) or the like, mineral oil based waxes such as montan wax, ozokerite(Ozokerite is a wax containing straight-chain, side-chain, and cyclic hydrocarbon having molecular weight of $C_{29}H_{60}$ to $C_{53}H_{108}$. Ozokerite is solid state in room temperature, and has superior holding property to oil, grease, and some kinds of solvent.), ceresin wax or the like, petroleum wax such as paraffin wax, microcrystallin wax, petrolatum or the like can all be used as natural waxes.

As synthetic waxes usable in the present invention, synthetic hydrocarbons such as Fischer-Tropsch wax, polyethylene wax or the like, denatured wax such as montan wax derivatives, paraffin wax derivatives, microcrystallin waxes derivatives or the like, hydrogenated waxes such as hardened castor oil, hardened castor oil derivatives, fatty acids such as 12-hydroxy stearic acid or the like, acid amides such as stearic acid amide, esters such as phthalic anhydride imide or the like, or chlorohydrocarbon, or mixed waxes in which these waxes are mixed can be used. These waxes can be used singly or in mixed condition. It is desirable that the melting point of the waxes be in a range of 60° C. to 130° C., and more desirably in a range of 80° C. to 100° C. In the case in which the melting point is less than 60° C., dripping occurs under high temperatures in summer before being dried if the wax is coated inside a car body. On the other hand, in the case in which the melting point is more than 130° C., production processes of the composition require high temperatures and it becomes difficult to use it in practice.

Specifically, it is desirable that paraffin wax, microcrystallin wax, petrolatum, polyethylene wax and each kind of denatured wax be used singly or in mixed condition.

Furthermore, in the present invention, rustproofing additives selected from sulfonates, carboxylic acid salts, fatty acid esters, amine salts, oxide paraffin salts, and oxide wax salts can be used instead of the waxes described above to obtain similar effects. Although there are rustproofing additives which are diluted by organic solvent beforehand, rustproofing additives having low content of volatile components are desirable for use in the present invention. Specifically, oil-reduced sulfonate, fatty acid esters, and oxide paraffin salts are desirable. It is more desirable that oil reduced calcium sulfonate salt and fatty acid esters be used alone or in mixtures.

In the present invention, a coated film can be made water-repellant by adding waxes or rustproofing additives. At the same time, efficient corrosion resistance can be obtained by forming precise continuous coated films. Furthermore, it is possible to control viscosity by using crystallization of wax. The contained amount of waxes and rustproofing additives of the present invention is in a range of 1 to 50 mass % of the overall composition, and is desirably in a range of 10 to 30 mass %. It is desirable that the contained amount of a material having high crystallinity be relatively low. On the other hand, it is desirable that the contained amount of material having low crystallinity be relatively high. If the contained amount is less than 1 mass %, sufficient corrosion resistance cannot be obtained. On the other hand, if the contained amount is more than 50 mass %, the viscosity becomes too high to reduce workability, and it becomes difficult to coat uniformly.

In the present invention, solvent is added to control viscosity desirably by dissolving or dispersing each component, and it can be selected from mineral oil type lubricant based oils, synthetic lubricant based agents, liquid saturated hydrocarbon mixtures, vegetable oil based semidrying oils, or vegetable oil based nondrying oils. Specifically, paraffin type lubricant based oil, naphthene type lubricant based oil or the like as the mineral oil type lubricant based oil, ester based, poly-α-olefin based, polyalkyleneglycol based, polybutene based, alkyldiphenylether based or the like as the synthetic lubricant based oil, liquid paraffin or the like as the liquid saturated hydrocarbon mixture, soybean oil, cottonseed oil, rapeseed oil, rice oil, sesame oil, sunflower oil, corn oil or the like as the vegetable oil based semidrying oil, or olive oil, arachis oil, tsubaki oil or the like as vegetable oil based nondrying oil can be used alone or in mixed condition.

Because solvents such as vegetable oil based semidrying oils and vegetable based nondrying oils include many double bonds in their molecules, from the viewpoint of long-term stability, mineral oil type lubricant based oils, synthetic lubricant based oils, or liquid saturated-hydrocarbon mixtures are desirable. Furthermore, in the present invention, oils having low volatility are desirable. Specifically, it is desirable that the volatilized amount at 105° C. over 3 hours be not more than 10 mass %, and more desirably not more than 1 mass %.

In the present invention, it is required to contain the above-mentioned heat polymerized drying oils. In addition, as a drying oil which can be further added to the heat polymerized drying oils, selected from oils having an iodine value not less than 130, linseed oil, perilla oil, tung oil, hempseed oil, safflower oil, oiticica oil, sardine oil, herring oil, dehydrated castor oil in which castor oil is dehydrated to produce conjugated acid, synthetic drying oil, or the like can be used. It is desirable that in particular among these oils, linseed oil, tung oil and dehydrated castor oil which can be obtained easily be used singly or in mixtures. It is more desirable that the contained amount of dehydrated castor oil be greater. In the present invention, the contained amount of drying oils is not more than 60 mass % of the overall composition, desirably not more than 10 mass %, and more desirably not more than 5 mass %. In the case in which the contained amount is more than 60 mass %, coating after drying of the rustproofing composition is too hard, and superior corrosion resistance by flexible coating, which is an advantage of the rustproofing wax, cannot be obtained.

Furthermore, in the rustproofing composition of the present invention, the hardness of the coating film can be controlled within a range which satisfies required quality, and pigments or fillers can be added to give thixotropy to improve dripping property. As the added pigment, red iron oxide, zinc powder, zinc phosphate or the like, and other various conventional kinds of pigments can be used. As the added filler, kinds of calcium carbonate, kinds of kaolin clay, kinds of talc, kinds of mica, kinds of bentonite, or other conventional extender pigments can be used. Furthermore, coloring pigments such as carbonblack or titanium oxide can be added to perform coloring.

In the rustproofing composition of the present invention, hardening accelerator can be added to improve or to control drying rate, and anti-skin-forming agents can be added to prevent surface hardening. As the hardening accelerator, cobalt naphthenate, manganese naphthenate, or other conventional additives can be used. As the anti-skin-forming agent, butylated hydroxytoluene or other conventional kinds of additives can be used. In the rustproofing composition of the present invention, deodorizer and adsorbent can be added to reduce and restrain odor which is generated during the hardening reaction by the oxidizing polymerization. As the deodorizer and the adsorbent, thymol or enzyme compound or other known conventional additives can be mentioned.

The rustproofing composition of the present invention can form efficient rustproofing skins for parts around tires, parts with pockets, and plate-bonded parts of car bodies by spray coating such as airless spray or air spray with conventional spray machines, by flow coating under a shower, or by direct coating with a brush or the like. It is desirable that the thickness of the coated film be not less than 30 μm in the case of long-term rustproofing.

BEST MODE FOR CARRYING OUT THE INVENTION

Next, the present invention is explained in detail by way of Examples and Comparative Examples. It should be noted that the present invention is not particularly limited to Examples described below.

1. Preparation of Rustproofing Composition

Example 1

Raw materials were mixed as shown in Table 1, and the mixture was heated to melting. Next, the mixture was agitated sufficiently by an agitator and was cooled to prepare the rustproofing composition of Example 1 of the present invention. In Tables 1 and 2, microcrystallin wax is a commercial product having a melting point of 87° C., calcium sulphonate is an oil-reduced product of basic alkylbenzene calcium salt, fatty acid ester is glycerin oleate, paraffin type lubricant based oil is a 500 neutral oil of a general commercial product, and liquid paraffin is a common commercial product having a kinematic viscosity of 70 mm$^2$/s at 40° C. Calcium carbonate particles used in the Example have diameters of 0.1 μm. Bentonite having an average particle diameter of 3 μm was dispersed in solvent beforehand and was used. The other raw materials used in the Example were common commercial products.

Example 2 to 19 and Comparative Example 1 to 9

In the same manner as in Example 1, except that each contained amount of raw material was change to an amount shown in Tables 1 and 2, rustproofing compositions of Examples 2 to 19 and Comparative Examples 1 to 9 of the present invention were prepared.

TABLE 1

| | | (mass %) | | | | | | | | | | | | | | | | | | |
|---|---|---|---|---|---|---|---|---|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
| Heat polymerized drying oil | Polymerized dehydrated castor oil | 5 | 3 | 5 | 15 | 35 | 50 | 10 | 10 | 10 | 10 | 10 | 10 | 10 | 10 | 10 | 10 | 5 | 5 | 5 |
| | Polymerized linseed oil | | | | | | | | | 5 | | | | | | | | | | |
| | Polymerized tung oil | | 2 | 5 | 5 | 5 | 5 | | | | | | | | | | | | | |
| Drying oil | Dehydrated castor oil | | | | | | | | | | | | | | | | | 1 | 2 | 10 |
| | Linseed Oil | | | | | | | | | | | | | | | | | | | |
| | Tung oil | | | | | | | | | | | | | | | | | | 3 | |
| Wax | Microcrystalline wax | 10 | 10 | 10 | 10 | 10 | 10 | 10 | 10 | 10 | | 1 | | 10 | 5 | 10 | 10 | 10 | 10 | 10 |
| Rustproofing additive | Calcium sulfonate | 10 | 10 | 10 | 10 | 10 | 10 | 10 | 10 | 10 | | | 1 | 40 | 30 | 10 | 10 | 10 | 10 | 10 |
| | Fatty acid ester | | | | | | | | | | 10 | | | | 15 | | | | | |
| Solvent | Paraffin type lubricant base oil | | | | | | | | | | | | | | | 63 | | | | |
| | Liquid paraffin | 75 | 73 | 65 | 55 | 35 | 20 | 70 | 63 | 58 | 73 | 82 | 82 | 33 | 33 | | | 67 | 63 | 58 |

TABLE 1-continued (mass %)

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|---|---|---|---|---|---|
| | Rapeseed oil | | | | | | | | | | | | | | | | 63 | | | |
| Filler | Calcium carbonate | | | | | | | | 5 | 5 | 5 | 5 | 5 | 5 | 5 | 5 | 5 | 5 | 5 | 5 |
| | Bentonite | | | | | | | | 1 | 1 | 1 | 1 | 1 | 1 | 1 | 1 | 1 | 1 | 1 | 1 |
| Hardening accelerator | Cobalt naphthenate | | | | | | | | 0.1 | 0.1 | 0.1 | 0.1 | 0.1 | 0.1 | 0.1 | 0.1 | 0.1 | 0.1 | 0.1 | 0.1 |
| Deodorizer | Thymol | | | | | | | | 1 | 1 | 1 | 1 | 1 | 1 | 1 | 1 | 1 | 1 | 1 | 1 |

TABLE 2

| | | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 |
|---|---|---|---|---|---|---|---|---|---|---|
| Heat polymerized drying oil | Polymerized dehydrated castor oil | 3 | | 60 | 60 | 10 | 10 | 10 | 10 | |
| | Polymerized linseed oil | | | | 5 | | | | | |
| | Polymerized tung oil | | 3 | 5 | | | | | | |
| Drying oil | Dehydrated castor oil | | | | | | | | | 30 |
| | Linseed oil | | | | | | | | | |
| | Tung oil | | | | | | 5 | | | |
| Wax | Microcrystalline wax | 10 | 10 | 10 | 10 | | | 10 | 10 | 10 |
| Rustproofing additive | Calcium sulfonate | 10 | 10 | 10 | 10 | | | 45 | | 10 |
| | Fatty acid ester | | | | | | | | 45 | |
| Solvent | Paraffin type lubricant based oil | | | | | | | | | |
| | Liquid paraffin | 75 | 75 | 15 | 15 | 84 | 79 | 29 | 29 | 44 |
| | Rapeseed oil | | | | | | | | | |
| Filler | Calcium carbonate | | | | | 5 | 5 | 5 | 5 | 5 |
| | Bentonite | | | | | 1 | 1 | 1 | 1 | 1 |
| Hardening accelerator | Cobalt naphthenate | | | | | 0.1 | 0.1 | 0.1 | 0.1 | 0.1 |
| Deodrizer | Thymol | | | | | | | | | |

Comparative Examples 10 to 12

A conventional rustproofing composition (trade name: NOX-RUST HS-700, produced by PARKER INDUSTRIES, INC.) was used as a rustproofing composition of Comparative Example 10. Furthermore, a conventional high-solid rustproofing wax (trade name: NOX-RUST 117, produced by PARKER INDUSTRIES, INC.) was used as a rustproofing composition of Comparative Example 11. Furthermore, the solvent of NOX-RUST HS-700 of Comparative Example 10 was changed to a lubricant oil to prepare a rustproofing composition of Comparative Example 12.

2. Evaluation Tests

Each of the Examples and Comparative Examples prepared in the manner described above were examined as explained below, and the properties were evaluated. The results are shown in Tables 3 and 4.

(1) Rustproofing Ability (Salt Spray Test)

The oil on a surface of a cold rolled steel plate (Japanese Industrial Standard G3141 SPCC-SD) having dimensions of length 70 mm, width 150 mm, thickness 0.8 mm was removed by solvent and dried. The rustproofing compositions of the Examples and Comparative Examples were coated on the surface of the steel plate to have a thickness of 30 μm by using a barcoater and were dried for 1 week at normal temperature, and a salt spray test was performed for 360 hours. Observing the appearance of each steel plate, the time required for the occurrence of rust was measured. The rustproofing ability was evaluated. A rust occurrence time of more than 240 hours is ◎, 120 to 240 hours is ○, 48 to 119 hours is Δ, and less than 48 hours is X.

(2) Condition of Coated Film After Drying

The oil on a surface of a cold rolled steel plate (Japanese Industrial Standard G3141SPCC-SD) having dimensions of length 70 mm, width 150 mm, and thickness 0.8 mm was removed by solvent and dried. The rustproofing compositions of the Examples and Comparative Examples were coated to the surface of the steel plate to have a thickness of 30 μm by using a barcoater and were dried for 1 week at normal temperature, and they were evaluated for hardness of the coated film and stickiness of the coated film by touching with a finger. In the evaluation, the coated film having no stickiness is ○, one having a little stickiness is Δ, and one having much stickiness and sticking to the finger is X. Furthermore, in the evaluation of hardness, a soft coating film having efficient flexibility is ○, and a coating which is too hard or too soft is X.

(3) Permeability

Two sheets of cold rolled steel plate (Japanese Industrial Standard G3141SPCC-SD) having dimensions of length 70 mm, width 150 mm, and thickness 0.8 mm were bent in angle of 30° at 50 mm from an edge of the length direction, and the oil on these plates was removed by solvent, and this was dried. Opposite surfaces of bent edge parts of these steel plates were faced to each other and bound to form a Y-shape. At this time, a teflon spacer having a thickness of 100 μm was put in both edge parts in the width direction. Next, these were fixed by a clip to form a jig for evaluation of permeability. This jig was set up so that the bent parts were up. 1 mL of the rustproofing compositions of the Examples and Comparative Examples were put into gap of the steel plates in which spacer was put from the upper part, and this was allowed to stand for 24 hours. After that, the jig was dismantled to measure the permeated length. In the evaluation, the permeated length of 30 mm or more is ○, and less than 30 mm is X. The atmosphere of the test, the jig, and the rustproofing compositions were kept at 10° C.

(4) Heat-Resistant Dripping Ability

The oil on a surface of a cold rolled steel plate (Japanese Industrial Standard G3141SPCC-SD) having dimensions of length 70 mm, width 150 mm, and thickness 0.8 mm was removed by solvent and was dried. The lower half part of the plate was masked, and the rustproofing compositions of each of the Examples and Comparative Examples were coated on the upper half part to have a thickness of 200 μm by a barcoater, and this was left for 1 week at normal temperature. Then the masking was pulled off, the plate was put standing vertical in a drier in which the atmosphere was 80° C. and was left for 1 hour. Dripping of each Examples and Comparative Examples were measured. In the evaluation of heat-resistant dripping ability, the dripped length less than 10 mm is ○, 10 to 50 mm is Δ, and more than 50 mm is X.

(5) Coating Workability

The rustproofing compositions of Examples and Comparative Examples were prepared to be 20° C., sprayed at a discharge pressure of 4.9 MPa on a chip having a bore diameter of $^{15}/_{100}$ inches by an airless pump for coating. Discharging conditions were observed and evaluated. In the evaluation of coating workability, when uniform atomization was obtained is ○, somewhat non-uniform is Δ, and non-uniform spotting is X.

(6) Paint Staining

On a painted plate in which a finishing paint for an automobile was coated, 0.1 mL of the rustproofing compositions of the Examples and Comparative Examples were dripped by a dropping pipet. The plate was horizontally placed in a drier in which the atmosphere was 60° C. for 1 hour, and was cooled to room temperature for 30 minutes. Next, the dripped rustproof composition was wiped by gauze containing solvent, and paint staining was evaluated. In the evaluation, ○: Not discolored and not swelled, Δ: Swelled, and X: Swelled and discolored.

(7) Drying Time

The oil on surface of a cold rolled steel plate (Japanese Industrial Standard G3141SPCC-SD) having dimensions of a length 70 mm, width 150 mm, and thickness 0.8 mm was removed by solvent and was dried. The rustproofing compositions of the Examples and Comparative Examples were coated to the surface of the steel plate to be 30 μm of coating thickness by using a barcoater, placed in a room at normal temperature, and drying conditions over time were evaluated by touching with a finger. In the evaluation, ○: Dried within 24 hours, Δ: Dried within a week, and X: Not dried.

(8) Nonvolatile Content

By applying a testing method of nonvolatile content in the testing method of coating content Japanese Industrial Standard K5407-4, nonvolatile content in the Examples and Comparative Examples were measured, and were evaluated. In the evaluation, ○: Nonvolatile content is more than 99%, Δ: 99% to 90%, and X: Less than 90%.

(9) Odor

On a bottom part of a rounded can for coating having a volume of 1 L which can be opened and closed by a lid, 5 mL of the rustproofing compositions of the Examples and Comparative Examples were dripped. The can was placed in a drying machine at 50° C. for 10 days with the lid of the can open, and was then placed for a further 1 hour with the lid closed. By sniffing in the can, the odor was evaluated. In the evaluation, ○: almost no smell, Δ: smelling but not a bad smell, and X: bad smell.

TABLE 3

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|---|---|---|---|---|
| Rustproofing ability (Salt spray test) | ○ | ○ | ◎ | ◎ | ○ | Δ | ◎ | ◎ | ◎ | ◎ | Δ | Δ | ◎ | ◎ | ◎ | Δ | ○ | ○ | ○ |
| Coating condition after drying (Sticking) | Δ | Δ | ○ | ○ | ○ | ○ | ○ | ○ | ○ | ○ | ○ | ○ | ○ | ○ | ○ | ○ | Δ | Δ | Δ |
| Coating condition after drying (Hardness) | ○ | ○ | ○ | ○ | ○ | ○ | ○ | ○ | ○ | ○ | ○ | ○ | ○ | ○ | ○ | ○ | ○ | ○ | ○ |
| Permeability | ○ | ○ | ○ | ○ | ○ | ○ | ○ | ○ | ○ | ○ | ○ | ○ | Δ | Δ | ○ | ○ | ○ | ○ | ○ |
| Heat-resistant dripping ability | Δ | Δ | ○ | ○ | ○ | ○ | ○ | ○ | ○ | ○ | ○ | ○ | ○ | ○ | ○ | ○ | Δ | Δ | ○ |
| Coating workability | ○ | ○ | ○ | ○ | ○ | ○ | ○ | ○ | ○ | ○ | ○ | ○ | Δ | Δ | ○ | ○ | ○ | ○ | ○ |
| Coating staining | ○ | ○ | ○ | ○ | ○ | ○ | ○ | ○ | ○ | ○ | ○ | ○ | ○ | ○ | ○ | ○ | ○ | ○ | ○ |
| Drying time | Δ | Δ | Δ | Δ | Δ | Δ | Δ | ○ | ○ | ○ | ○ | ○ | ○ | ○ | ○ | ○ | ○ | ○ | ○ |
| Nonvolatile content | ○ | ○ | ○ | ○ | ○ | ○ | ○ | ○ | ○ | ○ | ○ | ○ | ○ | ○ | Δ | ○ | ○ | ○ | ○ |
| Odor | Δ | Δ | Δ | Δ | Δ | Δ | Δ | ○ | ○ | ○ | ○ | ○ | ○ | ○ | ○ | ○ | ○ | ○ | ○ |

TABLE 4

| | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 | C. Ex. 12 |
|---|---|---|---|---|---|---|---|---|---|---|---|---|
| Rustproofing ability (Salt spray test) | X | X | X | X | X | X | ◎ | ◎ | ◎ | ◎ | ◎ | Δ |
| Coating condition after drying (Sticking) | X | X | ○ | ○ | ○ | ○ | Δ | Δ | ○ | ○ | ○ | X |
| Coating condition after drying (Hardness) | X | X | X | X | ○ | ○ | ○ | ○ | ○ | ○ | ○ | X |
| Permeability | ○ | ○ | ○ | ○ | ○ | ○ | X | X | ○ | ○ | ○ | ○ |
| Heat-resistant dripping ability | X | X | ○ | ○ | ○ | ○ | Δ | Δ | ○ | ○ | ○ | X |

TABLE 4-continued

|  | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 | C. Ex. 12 |
|---|---|---|---|---|---|---|---|---|---|---|---|---|
| Coating workability | ○ | ○ | ○ | ○ | ○ | ○ | X | X | ○ | ○ | ○ | ○ |
| Coating staining | ○ | ○ | ○ | ○ | ○ | ○ | ○ | ○ | ○ | Δ | Δ | ○ |
| Drying time | X | X | ○ | ○ | ○ | ○ | ○ | ○ | ○ | ○ | ○ | X |
| Nonvolatile content | ○ | ○ | ○ | ○ | ○ | ○ | ○ | ○ | ○ | X | X | Δ |
| Odor | ○ | ○ | X | X | Δ | Δ | Δ | Δ | X | Δ | Δ | Δ |

As shown in Tables 3 and 4, the rustproofing compositions of Examples 1 to 19 of the present invention exhibit superior characteristics in every tested point, and there is no problem in practical use. In particular, among these, the rustproofing compositions of Examples 8 to 10 were evaluated as not less than ○ in every tested point and it is clear that these compositions are extremely superior as rustproofing wax compositions which have less impact on the environment. However, Comparative Examples 1 and 2 in which the contained amount of heat-polymerized drying oil is too low did not exhibit sufficient characteristics on the tested points of rustproofing ability, coating conditions after drying, heat-resistant dripping, and time required for drying. On the other hand, Comparative Examples 3 and 4 in which the contained amount of heat-polymerized drying oil is too great, have problems in the tested points of rustproofing ability and coating hardness after drying. Furthermore, Comparative Examples 5 and 6 in which the contained amount of wax and/or rustproofing additive are/is too low could not exhibit sufficient rustproofing ability, and on the other hand, Comparative Examples 7 and 8 in which the contained amount of wax and/or rustproofing additive are/is too high have serious problems in the tested points of permeability and coating workability. Furthermore, Comparative Examples 3 and 4 in which the contained amount of heat-polymerized drying oil is too great and Comparative Example 9 in which the contained amount of drying oil is too high have problems in the tested points of odor. The reason for the odor is thought to that be volatile components are generated during oxidation of the drying oils.

Furthermore, the rustproofing composition of the present invention can exhibit long-term rustproofing ability which is similar to that of Comparative Examples 10 to 12 which are rustproofing waxes containing conventional organic solvents, and that, in spite of the rustproof composition of the present invention being able to be used in the same method as in a conventional one, the volatile organic solvent content is low. Therefore, it is obvious that the invention is an efficient rustproofing composition which has less impact on the environment and which can have superior effects with respect to global warming. Furthermore, in the present invention, rustproofing compositions having desirable characteristics can be prepared by changing the contained amount of heat-polymerized drying oil, wax, and/or rustproofing additive.

What is claimed is:

1. A rustproofing composition comprising:
at least one heat-polymerized drying oil selected from the group consisting of polymerized oils having an iodine value of not less than 130 and which are heat-polymerized, and present in an amount ranging from 5 to 60 mass % of the rustproofing composition;
at least one wax selected from the group consisting of natural waxes and synthetic waxes; and
at least one rustproofing additive selected from the group consisting of sulfonates, carboxylic acid salts, fatty acid esters, amine salts, oxide paraffin salts, and oxide wax salts,
wherein the wax and the rustproofing additive together are present in an amount ranging from 1 to 50 mass % of the rustproofing composition,
wherein the heat-polymerized drying oil, the wax, and the rustproofing additive are dissolved or dispersed in at least one solvent selected from the group consisting of mineral oil lubricant based oils, synthetic lubricant oil based materials, liquid saturated hydrocarbon mixtures, vegetable oil based semidrying oils, and vegetable oil based nondrying oils, and
wherein a nonvolatile content of the rustproofing composition at 105° C. for 3 hours is not less than 90 mass %.

2. The rustproofing composition according to claim 1, wherein the solvent is at least one selected from the group consisting of mineral oil lubricant based oils, synthetic lubricant oil based materials, and liquid saturated hydrocarbon mixtures.

3. The rustproofing composition according to claim 1, wherein the heat-polymerized drying oil is present in an amount ranging from 10 to 20 mass % of the rustproofing composition.

4. The rustproofing composition according to claim 2, wherein the heat-polymerized drying oil is present in an amount ranging from 10 to 20 mass % of the rustproofing composition.

5. The rustproofing composition according to claim 1, wherein the composition further contains deodorizer.

6. The rustproofing composition according to claim 2, wherein the composition further contains deodorizer.

7. The rustproofing composition according to claim 3, wherein the composition further contains deodorizer.

8. The rustproofing composition according to claim 4, wherein the composition further contains deodorizer.

* * * * *

UNITED STATES PATENT AND TRADEMARK OFFICE
CERTIFICATE OF CORRECTION

PATENT NO. : 7,462,226 B2  
APPLICATION NO. : 11/167118  
DATED : December 9, 2008  
INVENTOR(S) : Takahide Maeda et al.

It is certified that error appears in the above-identified patent and that said Letters Patent is hereby corrected as shown below:

TITLE PAGE -

Item (73) Assignee: add as follows:

-- Parker Industries, Inc., Tokyo, Japan --

Signed and Sealed this

Seventeenth Day of November, 2009

David J. Kappos  
*Director of the United States Patent and Trademark Office*